United States Patent [19]

Elsner, Jr. et al.

[11] Patent Number: 4,574,458
[45] Date of Patent: Mar. 11, 1986

[54] ROLL-CAPPING MACHINE AND METHOD

[75] Inventors: Frank Elsner, Jr.; Robert E. Molison, both of Hanover, Pa.

[73] Assignee: Elsner Engineering Works, Inc., Hanover, Pa.

[21] Appl. No.: 627,819

[22] Filed: Jul. 5, 1984

[51] Int. Cl.⁴ .................. B23P 19/02; B23P 21/00; B23P 19/00
[52] U.S. Cl. ............................ 29/525; 29/771; 29/822
[58] Field of Search ............ 29/525, 771, 822, 809, 29/823; 198/345, 775, 750; 414/749

[56] References Cited

U.S. PATENT DOCUMENTS

| 525,100 | 8/1894 | Gould. | |
|---|---|---|---|
| 540,366 | 6/1895 | Schaake. | |
| 560,024 | 5/1896 | Ellefsen. | |
| 800,408 | 9/1905 | Sharp. | |
| 1,164,103 | 12/1915 | Kruse. | |
| 2,004,816 | 6/1935 | Lindgren | 198/345 |
| 2,117,523 | 5/1938 | Strohl | 414/749 |
| 2,259,748 | 10/1941 | Hullhorst | 198/34 |
| 3,238,908 | 3/1966 | Gilbert | 113/26 |
| 3,342,375 | 9/1967 | Johnson et al. | 221/308 |
| 3,382,646 | 5/1968 | Leudtke et al. | 53/128 |
| 3,462,044 | 8/1969 | McKenna | 221/308 |
| 3,908,572 | 9/1975 | Johnson et al. | 113/1 |
| 4,040,513 | 8/1977 | Walls | 198/530 |
| 4,388,989 | 6/1983 | Edmunds et al. | 198/339 |
| 4,423,584 | 1/1984 | Elsner et al. | 53/415 |

Primary Examiner—Howard N. Goldberg
Assistant Examiner—Steven Nichols
Attorney, Agent, or Firm—Thomas Hooker

[57] ABSTRACT

Apparatus and method for inserting a plastic cap into the open end of a roll. Spaced rolls are moved downstream along a continuously moving conveyor and are lifted from the conveyor for capping. A cap gravity falls down a chute to a loading position where it is picked up by a plunger and seated in the end of the lifted, aligned roll. The capped roll is then returned to the conveyor.

26 Claims, 6 Drawing Figures

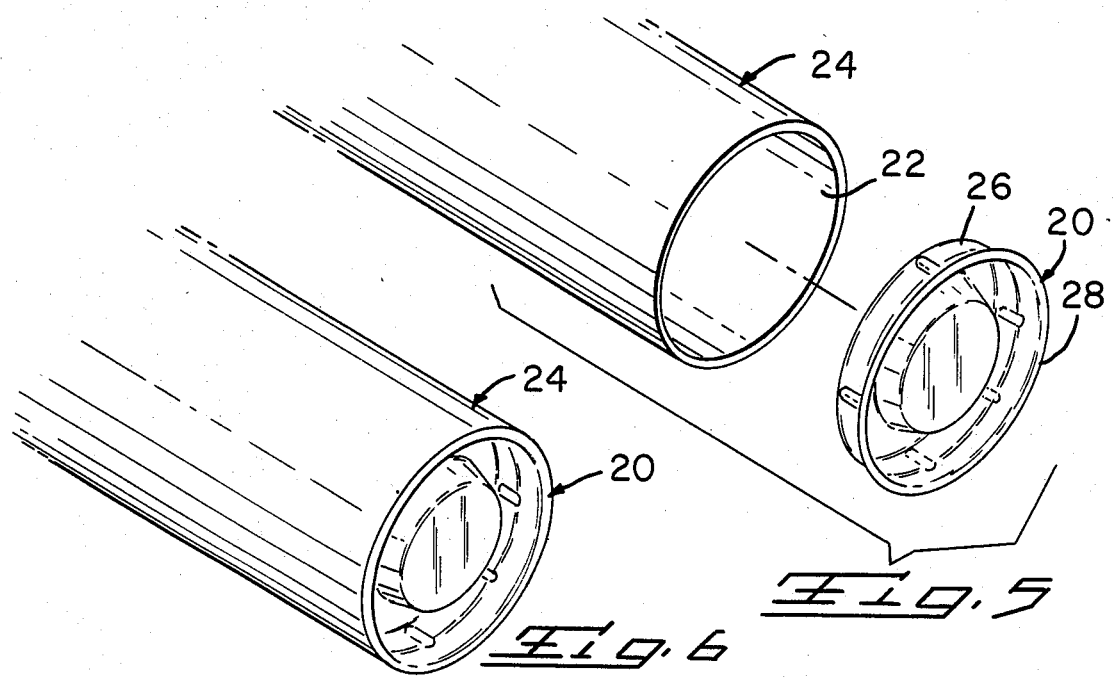
Fig. 5
Fig. 6
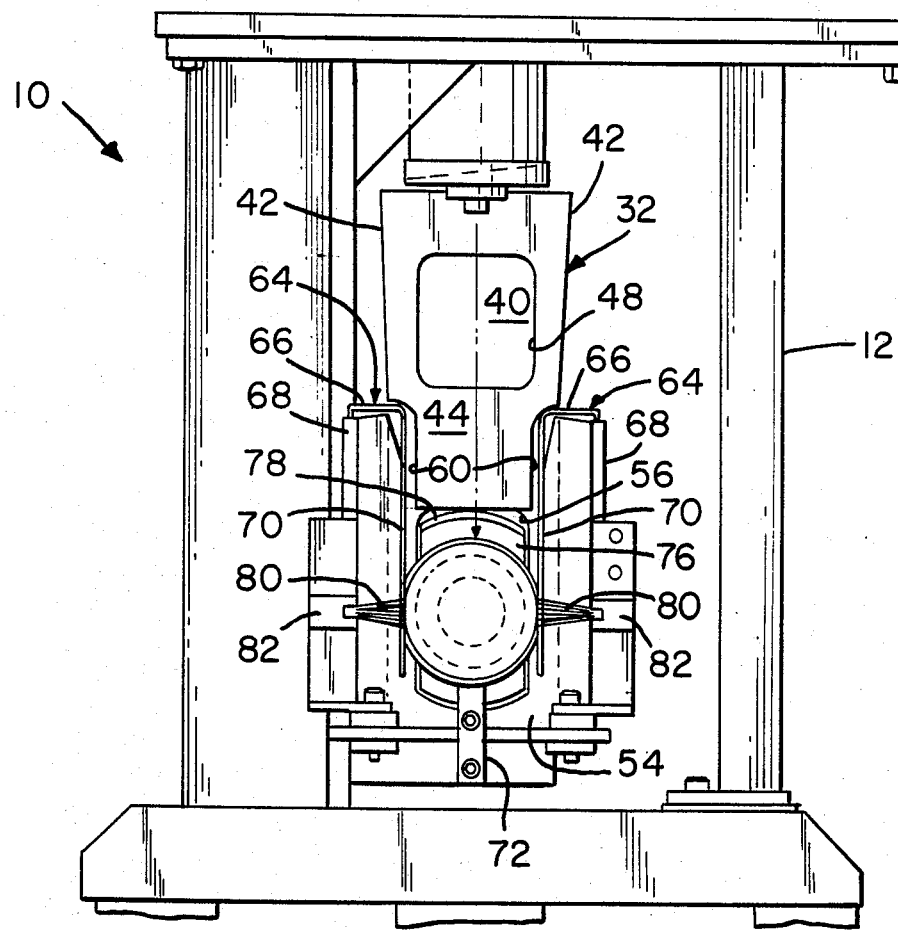
Fig. 3

ROLL-CAPPING MACHINE AND METHOD

The invention relates to a machine and method for applying thin plastic caps to the ends of rolls, preferably long, narrow rolls including a wound length of paper. Conventionally, these rolls are capped manually.

The roll-capping machine may be located between a rewinder used to form individual rolls of wound paper and a roll wrapping machine used to wrap the rolls with a heat shrink envelope. The wrapping machine may be of the type shown in U.S. Pat. No. 4,423,584. Rolls are conveyed from the rewinding machine to the roll wrapping machine by a conveyor including downstream moving lower conveying belts and fixed hold down bars located above the belts so that the rolls frictionally engage the hold down bars and are rotated downstream along the bars by the belts.

The machine includes a roll presentation assembly which engages each downstream moving roll and lifts it above the conveyor belts and into the hold down bars so it is in a stationary and known capping position with the open end to be capped in alignment with a cap seating assembly. The cap seating assembly includes a plunger which is extended toward the roll, picks up a cap from a loading position and secures the cap on into the end of the aligned, stationary roll. Wire and brush holders confine the cap on the moving plunger to assure it is properly seated on the roll end.

Following capping of the roll and withdrawal of the cap seating assembly, the roll presentation assembly lowers the capped roll back onto the conveyor into engagement with the conveyor belts and hold down strips for continued downstream movement toward the roll wrapping machine.

A cap delivery assembly includes a cap dispenser and a specialized gravity chute extending from the dispenser to the loading position. Caps are individually delivered into the chute and slide down the bottom wall of the chute to the loading position. The wire holders guide the falling caps to the loading position for proper pickup by the plunger.

The machine and method rapidly and accurately cap rolls as they are moved from the rewinding machine to the wrapping machine. The capping operation is automatic and does not require additional production time or personnel.

The disclosed roll capping machine caps one end of rolls only. Rolls capped in this manner may be displayed vertically with the capped ends up to present a neat and attractive appearance. If desired, cap delivery and cap seating assemblies may be provided on both sides of the roll conveyor in order to cap both ends of the roll. Single or plural cap dispensers may be provided as required.

Other objects and features of the invention will become apparent as the description proceeds, especially when taken in conjunction with the accompanying drawings illustrating the invention, of which there are four sheets and one embodiment.

IN THE DRAWINGS

FIG. 3 is a view taken along line 3—3 of FIG. 2;

FIGS. 5 and 6 are views illustrating seating of a cap on the end of a roll.

DESCRIPTION OF THE ROLL-CAPPING MACHINE

Figure 1:
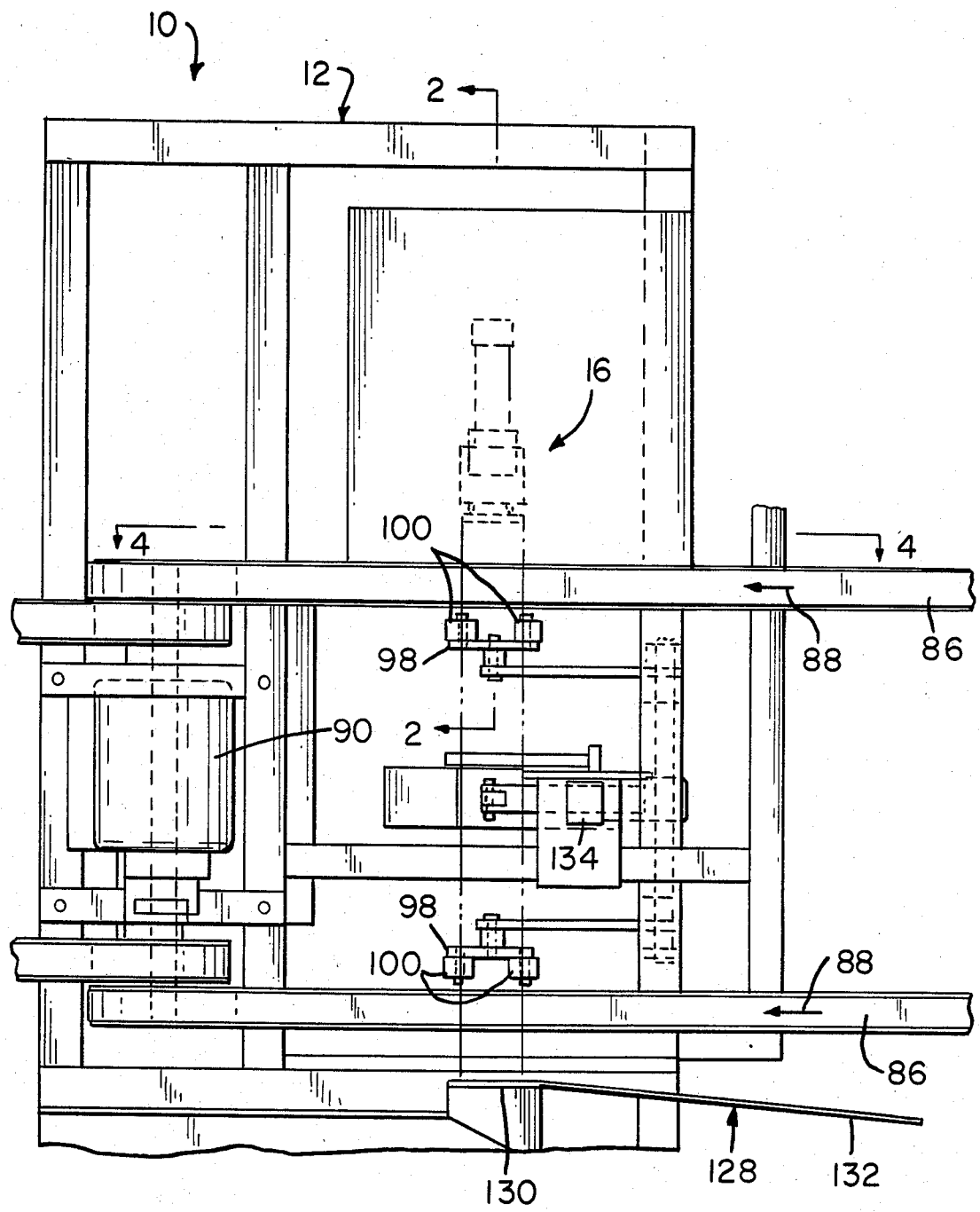
FIG. 1 is a top view of the roll capping machine taken below the hold down bars.

Roll capping machine 10 includes a frame 12, a cap delivery assembly 14 for supplying individual caps to a work pickup position; a cap seating assembly 16 for moving the caps from the delivery position and seating the caps in the ends of presented rolls; and a roll presentation assembly 18 for orienting each roll of a series of rolls in a position to receive a cap from the seating assembly. The assemblies 14, 16 and 18 are suitably mounted on frame 12.

The machine 10 automatically inserts thin plastic end caps 20 into the open ends 22 of rolls 24. The delivery assembly positions an individual cap 20 in a loading position in axial alignment with a roll presented by assembly 18 following which the seating assembly moves the cap axially toward the roll to force the cylindrical cap body 26 into the open end 22 until cap lip 28 seats snugly on the end of the roll as shown in FIG. 6. The cap is secured on the end of the roll by a tight frictional fit between the body and the interior of the roll. The roll 24 preferably includes a length of snugly wound paper which may or may not have an interior core. Apparatus 10 may be used to cap other types of rolls or bodies.

The cap delivery assembly 14 includes a cap dispenser 30 on frame 12 and a gravity chute 32 located below the dispenser for receiving individual caps as discharged from the dispenser and guiding the caps to a loading position 34 for pickup by the seating assembly 16. The cap dispenser 30 disclosed in the drawings includes three rotary flights 36 which are rotated to engage the lower most cap of a nested stack of caps 38 such that the cap is separated from the stack and falls into the mouth 46 of the chute 32. Other types of dispensers may be used with machine 10. The type of dispenser used for discharging caps into the gravity chute forms no part of the present invention.

The chute 32 includes a downwardly sloping bottom wall 40, side walls 42 and a top wall 44, an interior cap passage 45 extends from an enlarged horizontal mouth 46 located immediately below the cap dispenser 30 to a smaller discharge mouth 47. Mouth 46 is rectangular in shape having length and width sufficient to receive a cap horizontally discharged from the stack 38 by dispenser 30 so that the cap falls downwardly into the passage and rests on the bottom wall 40 as indicated at 48. Mouth 47 is slightly wider than the caps and has a height slightly greater than the cap height. Caps are discharged into the chute with lips 20 resting on the bottom wall of the chute and the cap bodies projecting upwardly from the bottom wall.

The bottom wall 40 below mouth 46 is slightly wider than the diameter of the cap 20 to assure that upon discharge the cap freely falls onto the bottom surface 40. As indicated in FIG. 3, sidewalls 42 converge slightly below the mouth to center the cap on the bottom wall. The top wall 44 closes the chute to assure that caps discharged by dispenser 30 are captured without jams. An inspection and clearing opening 48 is provided in top wall 44, as shown in FIG. 3.

Figure 2:
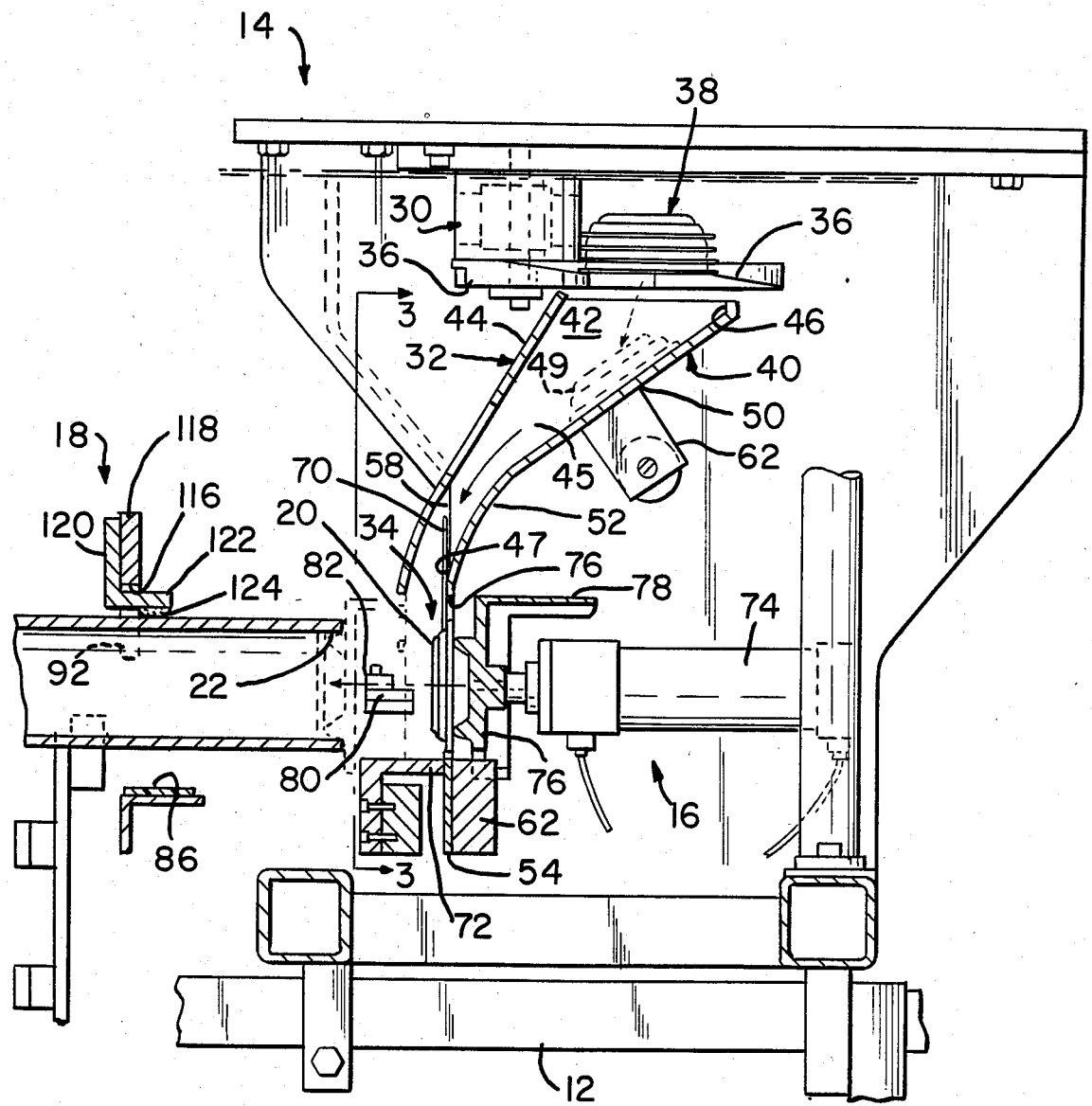
FIG. 2 is a view taken generally along line 2—2 of FIG. 1.

The bottom wall includes a flat portion 50 located below mouth 46 and sloping downwardly at an acute angle, a curved portion 52 at the lower end of portion 50 and a vertical portion 54 which extends past and below the loading position 34. A plunger cutout 56 is provided in the vertical portion 54, as shown in FIGS. 2 and 3. The height of the side walls 42 is reduced in a direction extending from the mouth 46 to mouth 47 located above the loading position. The vertical side wall ends 58 form continuations of the vertical portion of the bottom wall. Cut outs 60 are in the sides of the top plate 44 extending beyond side wall ends 58 to reduce the width of the end of the top wall. The chute is suitably mounted on frame 12 by connections 62.

Cap guide wires 64 extend into the lower end of the chute 32 between the top and bottom walls to capture the lips of the caps sliding down the chute and thereby guide the caps to the loading position. Each wire 64 includes a short horizontal leg 66 having an end secured in support 68 to one side of the loading position and a long, straight leg 70 extending downwardly from leg 66 and past the plunger cutout 56 and loading position as shown in FIG. 3 so that the wires 64 assume a generally L-shape. The vertical legs 70 are spaced apart a distance equal to or slightly greater than the maximum diameter of the cap body 26 but less than the maximum diameter of the cap lip 28. As indicated in FIG. 2, legs 70 are located outwardly of the vertical section 54 of bottom wall 40 sufficient to receive the cap lit and confine the cap against the bottom wall. Wire legs 70 extend into the chute at the cutouts 60 adjacent the ends 58 of the sidewalls to capture caps sliding down the bottom wall and guide the caps to the loading position 34 shown in FIG. 2. Caps falling down the chute bottom to the loading position 34 land on fixed support rail 72 which extends from the lower end of bottom wall 40 outwardly in a direction toward the roll presentation assembly 18.

The cap seating assembly 16 includes an air cylinder 74 mounted on frame 12 and having a piston rod attached to a cap seating plunger 76 located behind the vertical portion 54 of bottom wall 40 when the cylinder is retracted, as shown in FIG. 2. The forward face of the plunger 76 includes semi-annular segments conforming to the interior shape of cap 20 as illustrated in FIG. 5. A curved cap shield 78 is attached to the top of the plunger to prevent the caps from sliding down chute 32 from falling to the loading position when the plunger is extended.

Cap retention brushes 80 are mounted in supports 82 with the ends of the bristles facing the loading position at a height above the top of support rail 72 equal to the radius of the cap and spaced apart sufficiently to frictionally engage the cap lip as the cap is moved from the loading position 34 to the seating position by plunger 76. The brushes 80 are located sufficiently outwardly of the bottom wall 54 so that they do not interfere with the fall of the caps down the chute to the loading position 34. See FIG. 2.

Roll presentation assembly 18 includes a conventional roll conveyor 84 having a pair of drive belts 86 which are continuously moved in the downstream direction of arrows 88 by a suitable drive motor 90. Fixed hold down bars 92 are secured to frame 12 above the belts 86. The bars carry resilient hold down strips 94 facing the belts such that rolls 24 are confined between the belts and the hold down strips and are rotated downstream in the direction of arrows 88. Uncapped rolls are fed into the upstream end of the conveyor 84 at spaced intervals and are discharged from the downstream end of the conveyor after capping. Individual rolls may be formed in a rerolling apparatus and delivered to the conveyor 84 for capping and discharged from the conveyor to a second conveyor leading to a roll wrapping machine.

Figure 4:
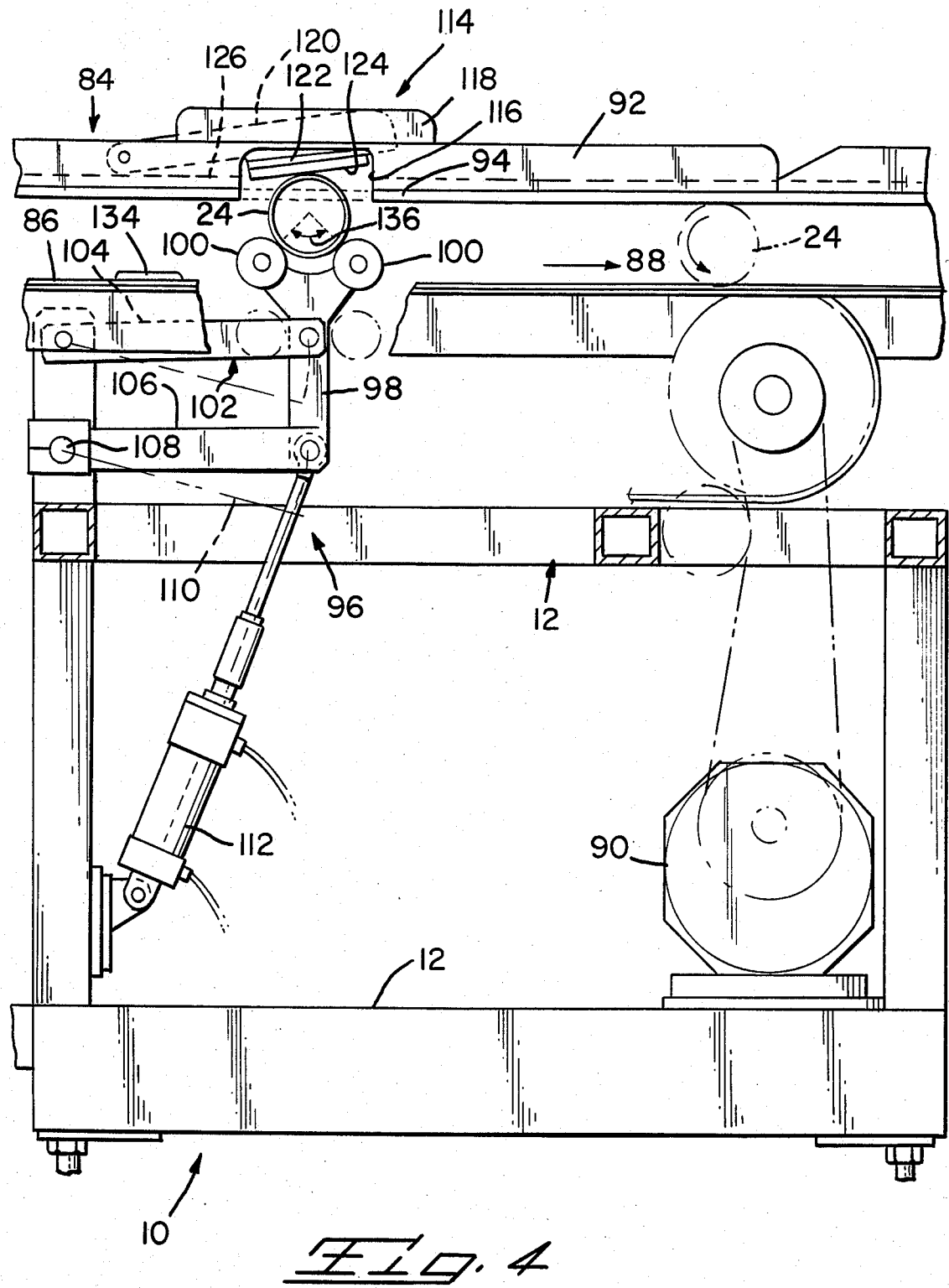
FIG. 4 is a view taken along line 4—4 of FIG. 1.

Roll lifter 96 shown in FIG. 4 removes individual rolls from conveyor 84 and moves the rolls up to proper alignment with the seating assembly to permit capping the rolls as shown in FIGS. 5 and 6. The roll lifter 96 includes a pair of Y-shaped lift arms 98 located outwardly of the loading position 34 between belts 86. The upper end of each arm carries a pair of spaced freely rotatable rollers 100 for capturing and lifting rolls 24. Each lift arm is part of a parallelogram linkage 102 on frame 12 which includes an upper pivot arm 104 and lower pivot arm 106. As shown in FIG. 4, the right hand ends of the pivot arms are pivotedly connected to the lower portions of lift arms 98. The left hand end of pivot arm 104 is pivotedly connected to frame 12 while the left hand end of lower pivot arm 106 is secured to shaft 108 journalled in bearings on the frame. The shaft 108 carries a control arm 110 which is connected to the piston rod of air cylinder 112, the other end of the air cylinder being secured to the frame. Extension of air cylinder 112, as shown in FIG. 4, lifts the rollers 100 above the conveyor belts 86. Retraction of the air cylinder withdraws the rollers below the conveyor belts.

Lift gates 114 are provided on fixed hold down bars 92 above lift arms 98 to permit movement of lifted rolls above the conveyors 86 and bars 92. A cut out section 116 of the resilient strip 94 and the lower portion of bar 92 is provided for each gate. The bar may be reinforced at 118 above the cut out. Each gate includes an arm 120 pivotedly secured to the bar 92 upstream a short distance of the cutout 116 and having a flange 122 extending into the cutout 116. A short resilient strip 124 is secured to the bottom of the flange 122. The strip 124 includes a polytetrafluorethylene surface for low friction engagement with rolls 24.

When air cylinder 112 is retracted gravity holds arm 120 against the upper surface 126 of bar 92 with short strip 124 strip 124 at the same level as fixed strip 94 to provide a continuous resilient strip for engaging rolls as they are fed along conveyor 84. Extension of air cylinder 112 lifts arms 98 to capture a roll 24 and raise the roll above belt 86 as shown in FIG. 4. The elevated roll engages and lifts the gates 114 as shown. Retraction of the air cylinder lowers the arm 98 below belts 86 so that the roll is lowered onto the belts and gates 114 close to re-establish continous resilient strips above the conveyor belts 86.

Roll capping machine 10 automatically inserts caps 20 into one end of each roll fed downstream along conveyor 84. As shown in FIG. 1, the machine is provided with a fixed end support plate 128 on the opposite side of conveyor 84 from the delivery and seating assemblies 14 and 16. The plate includes a base 103 axially aligned with the lift arms 98, loading position 34 and plunger 76 and an upstream extending guide 132 with slopes away from the conveyor 84 at a shallow angle in order to pickup the adjacent end of each roll moved downstream along the conveyor and assure the end rests on the base during capping. In this way the roll is supported against axial shifting during capping.

It is contemplated that the invention may be used to cap both ends of a roll simultaneously. In this event, delivery and seating assemblies would be provided on both sides of the conveyor 84 with single or plural cap dispensers supplying caps to the delivery assemblies. The support plate 128 would not be used. The roll would be stabilized between the plungers during capping.

OPERATION OF THE ROLL-CAPPING MACHINE

Machine 10 includes a control circuit (not illustrated) including a timer having a cycle of operation initiated when a roll travelling downstream along conveyor 84 trips trigger 134 located between belts 86 upstream of the lift arm 98. During cycling the various components of the machine are actuated in the manner described below.

At the start of the cycle of operation of the machine 10, the cylinders 74 and 112 are retracted and a cap 20 has been fed to the loading position 34 as indicated in FIGS. 2 and 3. The cap lip is flush on the vertical portion 54 of the chute bottom wall and wires 70 extend over the cap lip on both sides of the cap to hold the cap in the loading position on rail 72. Lift gates 114 are closed to permit the conveyor to feed a roll over arms 98. Drive belts 86 are continously moved downstream in the directions of arrows 88.

Rolls are automatically fed into the upstream end of conveyor 84 and are rotated downstream between belts 86 and the resilient strips 94. When a roll engages trigger 136 the control circuit cycle is initiated and cylinder 112 is extended. The roll continues to roll downstream along strips 94 and onto the short strips 124 on the lowered lift gates 114. The extension of cylinder 112 and subsequent raising of lift arms 98 is timed to capture the roll between the two pairs of rollers 100 as they are raised, thereby lifting the roll above belts 86 and at the same time raising the gates 114 so that the roll is not deformed during the capping operation. The rollers and gate capture the free end of the length of paper wound on the roll to assure the roll does not unwind during capping and can be returned to the conveyor and fed downstream after capping.

During set up of the machine, the switch 136 is located a distance upstream of the lift arms 98 sufficient that, taking into consideration the speed of downstream movement of rolls along conveyor 84 and the rise time for the arms 98, the roll is calculated to be above the arms as they are raised to assure proper capture between the pairs of rollers 100. The rollers on each lift arm are spaced apart a distance sufficient to engage the roll at locations spaced apart by a circumferential angle 136 of about 90 degrees. See FIG. 4. This spacing is sufficiently great to assure that when the arms are lifted they reliably capture the downstream moving and rotating rolls and properly align the rolls with respect to the seating assembly 16 as the rolls are raised above belts 86. Also, the spaced pairs of rollers 100 capture and properly align rolls which may be slightly skewed or ahead of or behind the nominal pick up position when lifted. The rollers 100 are freely pivoted on arms 98 to facilitate low friction engagement with the rotating rolls and proper seating of the rolls on the raised arms. The weight of gates 120 forces the rolls toward the rollers 100 to assure proper alignment of the roll as it is lifted and confine the free paper end, as mentioned previously.

When the roll 24 has been elevated the control circuit extends cylinder 74 thereby moving plunger 76 and shield 78 through plunger cut out 56 to pickup the cap 20 in the loading position 34, plunger fits snugly within the recess in the back of of the cap.

As the plunger moves the cap toward the roll the guide wires 64 flex outwardly and help hold the cap on the plunger. Eventually they fall away from the cap lip 28 and return to their unstressed positions shown in FIGS. 2 and 3. When the wires fall away the cap has been moved outwardly of the loading position sufficiently that the cap body 26 engages the opposed brushes 80, thereby assuring a continued drag force is applied to hold the cap on the plunger as it is moved toward the roll. The brushes 80 provide a drag force on the cap body and lip until the forward end of the body is piloted into the open roll end 22. Further extension of the cylinder 74 extends the plunger to the dotted position of FIG. 2 to fully seat the cap on the roll with the lip sandwiched between the plunger and the end of the roll. During seating of the cap in the roll end the opposite end of the roll engages base 130 to prevent axial shifting.

When the cylinder 74 is extended and the plunger is in the dashed position of FIG. 2 the cap shield 78 is moved through opening 56 to close the discharge mouth 47 of chute 32. The control circuit retracts the cylinder 74 immediately following seating of the cap.

When the cylinder 74 is retracted the control circuit retracts cylinder 112 to lower arms 98 and return the capped roll to conveyor 84. As the roll is lowered the gravity lift gates 114 return to their normal position with strips 124 aligned with strips 94 so that the conveyor then picks up the roll and rotates the roll downstream for subsequent discharge.

The control circuit operates the cap dispenser 30 to deliver the next cap 20 to the chute 32 after the cylinder 74 has extended to move the cap shield 78 and block the bottom of the chute. The cap falls on the upper portion of the lower wall 40 as indicated on dotted lines in FIG. 2 and gravity slides down the wall and around the curved portion 52. The sidewalls 42 center the cap as it falls down the chute onto the extended cap shield 78. Upon retraction of cylinder 74 and withdrawal of the plunger from below the chute the cap continues to fall down the curved portion 52 of the lower wall. The cap body 26 moves past the straight wire legs 70 which engage the cap lip 28 to rotate and guide the descending cap so that the lip end of the cap is flush on the vertical lower portion of the wall 40 and the cap falls between the wires and along the vertical portion of the bottom wall to the pickup position 34. The cycle of operation is completed when the plunger has been returned and the next cap has fallen to the loading position.

As shown in FIG. 3, the wires 70 and brushes 80 are located outwardly of the plunger cutout 56 so that the plunger and cap shield are withdrawn without disturbing the wires or brushes. Rail 72 fits within a slot provided in the bottom of the plunger to aid in supporting and orienting the plunger as it is moved by cylinder 74.

The roll presentation assembly 18 may use Y-shaped lift arms with low friction surfaces on the interior of the arms in place of rollers 100. When these arms are raised the surfaces engage the roll so that the roll slides down along the surfaces and is aligned between the arms as previously described. The resilient strip 124 on the bottom of the gate is provided with a low friction surface to enable the roll to slide along the gate as it is seated in the arms. The low friction surfaces on the arms may be formed of polytetrafluorethylene and the low friction surface on the strip may be formed of a polytetrafluorethylene tape adhered to the strip. All of the low friction surfaces on the lift arms and the gate strips minimize frictional engagement with the roll to assure that the roll is properly oriented by the lift arms when it is fully raised.

As used in this description, the term "roll" is i intended to include cylindrical bodies with ends suitable for capping. Thus, while the invention is particularly useful in capping open ended wound paper rolls, it may be used to cap other types of bodies.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim our invention is:

1. A roll capping machine comprising a roll presenting assembly including a conveyor with a downstream moving conveyor belt and a fixed hold down bar above the conveyor belt so that rolls are translated and rotated downstream along the conveyor between the belt and bar; a roll lifter including a lift arm normally located below the conveyor belt and means for raising the lift arm above the conveyor belt; a lift gate located in the bar above the lift arm whereby said means raises the arm to engage a roll moving downstream along the conveyor, lifts the roll and gate above the conveyor belt and moves the roll to a stationary roll capping position; and cap seating means for applying a cap on an end of the lifted and stationary roll.

2. A roll capping machine as in claim 1 wherein the gate includes means forcing the roll against the lift arm.

3. A roll capping machine as in claim 2 wherein said lift arm includes two low friction roll contact means spaced apart along the conveyor path whereby such means capture and align the roll as the arm is lifted.

4. A roll capping machine as in claim 3 wherein said contact means comprise rollers.

5. A roll capping machine as in claim 3 including resilient strips on the hold down bar and on the gate, such strips facing the conveyor belt for engagement with the roll.

6. A roll capping machine as in claim 5 including a recess in the hold down bar, the gate normally spanning the recess such that the strips are continuous along the length of the conveyor.

7. A roll cppping machine as in claim 6 wherein the gate is pivotedly mounted to the hold down bar and the weight of the gate forces the roll against the lift arm.

8. A roll capping machine as in claim 7 including a pair of like lift arms spaced transversely across the width of the conveyor and wherein the means for raising the lift arm raises both lift arms to capture and align the roll.

9. A roll capping machine as in claim 8 incuding a pair of like hold down bars, each bar including a like lift gate located above and adjacent each lift arm.

10. A roll capping machine as in claim 9 wherein said cap seating means comprises a cap delivery assembly for moving individual caps to a loading position axially aligned with the lifted roll and a cap seating assembly for moving the cap from the loading position to the end of the roll.

11. A roll capping machine as in claim 10 wherein the cap seating assembly includes a plunger movable past the loading position and to the end of the roll to pickup and drive the cap onto the roll and including drag means for holding the cap against the plunger as it is moved toward the roll.

12. A roll capping machine as in claim 11 wherein said drag means includes brushes located on opposite sides of the cap having bristles extending into engagement with the cap sides, such brushes having an axial length sufficient to hold the cap on the plunger until the cap extends past the end of the roll.

13. A roll capping machine as in claim 12 wherein said drag means includes alignment members for guiding the cap to the loading position.

14. A roll capping machine as in claim 13 wherein said alignment members comprise spaced wires extending from the delivery assembly to the loading position for engaging the edges of the cap to guide the cap to the loading position and also hold the cap against the plunger during initial movement away from the loading position.

15. A machine for applying a cap to an end of a roll, the cap having a central body and a lip, the machine including a cap dispenser; a gravity chute located beneath the dispenser having a bottom wall with an angled upper portion beneath the cap dispenser, a curved middle portion and a vertical lower portion for receiving a cap discharged from the dispenser and conveying the cap to a lower cap loading position at the lower portion; roll presentation means to one side of the cap loading position; a cap plunger and means for moving the cap plunger past the cap loading position to pick up a cap in such position and seat the cap on an end of a roll carried by the roll presentation means; a pair of flexible generally vertical guide wires secured to the machine a short distance from the vertical lower portion of the chute bottom wall and extending above the upper end of the lower portion of the bottom wall, the wires being spaced apart a distance greater than the transverse dimension of the cap body and less than the transverse dimension of the cap lip whereby a cap discharged by the cap dispenser gravity slides down the upper portion of the lower wall and around the curved portion so that the central body extends past the guide wires and the wires engage the cap lip and guide the cap to the cap loading position on the vertical lower wall portion, said wires holding the cap in place for engagement by the plunger and then flexing out of the path of movement of the cap and plunger as the cap is moved toward the roll.

16. A machine as in claim 15 including cap brushes located to either side of the path of movement of the plunger toward the roll engabable with the lip to hold the cap on the plunger.

17. A machine as in claim 16 wherein the brushes engage the cap before the wires flex away from the cap, the brushes and wires cooperating to hold the cap on the plunger during movement toward the roll.

18. The method of applying a cap to an end of a roll including the steps of:
  (a) Rotating and translating a roll along a conveyor path between a downstream moving conveyor belt and a fixed hold down bar spaced from the conveyor belt;
  (b) Locating the roll in a stationary roll capping position by moving the roll away from the belt and into the bar;
  (c) Applying a cap to one end of the located roll; and
  (d) Returning the capped roll to between the belt and bar for continued rotation and translation along the conveyor path.

19. The method of claim 18 including the step of applying a force to the roll in a direction toward the belt while the roll is removed from the belt.

20. The method of claim 19 including the step of aligning the roll in a desired upstream—downstream position as the roll is moved away from the belt.

21. The method of claim 20 including the step of holding the roll against axial shifting during capping.

22. The method of claim 21 including the step of moving the roll away from the belt by capturing the roll between two first circumferential portions of the roll spaced apart approximately 90 degrees.

23. The method of claim 22 including the step of moving the roll away from the belt by engaging two additional circumferential portions of the roll spaced apart approximately 90 degrees, the additional portions being separated along the roll from the first portions.

24. The method of claim 23 including the step of simultaneously applying caps to both ends of the roll.

25. The method of claim 18 wherein the roll includes a wound length of paper having a free end, including the step of preventing unwinding of the free end while the roll is removed from the belt.

26. A roll capping machine as in claim 5 wherein the resilient strip on the gate includes a low friction surface facing the conveyor belt.

* * * * *

UNITED STATES PATENT AND TRADEMARK OFFICE
CERTIFICATE OF CORRECTION

PATENT NO. : 4,574,458
DATED : March 11, 1986
INVENTOR(S) : Frank Elsner, Jr. et al It is certified that error appears in the above—identified patent and that said Letters Patent is hereby corrected as shown below:

Column 3, line 25 "lit" should be --lip--.

Column 4, line 40 delete "strip 124"; line 48 change "continous" to --continuous--; and line 59 change "pickup" to --pick up--.

Column 7, line 4, delete "i"; line 46 change "cppping" to --capping--; line 54 change "incuding" to --including--; and line 65 change "pickup" to --pick up--.

Signed and Sealed this

Seventeenth Day of June 1986

[SEAL]

*Attest:*

DONALD J. QUIGG

*Attesting Officer*  *Commissioner of Patents and Trademarks*